United States Patent
Berman

(10) Patent No.: US 8,533,117 B2
(45) Date of Patent: Sep. 10, 2013

(54) METHODS AND APPARATUS FOR PROVIDING CURRENCY AT AN AIRLINE CHECK-IN MACHINE

(76) Inventor: Jared K. Berman, Chicago, IL (US)

(*) Notice: Subject to any disclaimer, the term of this patent is extended or adjusted under 35 U.S.C. 154(b) by 381 days.

(21) Appl. No.: 12/622,136

(22) Filed: Nov. 19, 2009

(65) Prior Publication Data

US 2011/0119183 A1    May 19, 2011

(51) Int. Cl.
*G06Q 40/00* (2012.01)

(52) U.S. Cl.
USPC ................................. 705/43; 705/35

(58) Field of Classification Search
USPC ................ 705/72, 14.37, 42, 43, 35
See application file for complete search history.

(56) References Cited

U.S. PATENT DOCUMENTS

| | | | |
|---|---|---|---|
| 4,150,740 | A | 4/1979 | Douno |
| RE32,115 | E | 4/1986 | Lockwood |
| 5,963,647 | A | 10/1999 | Downing |
| 6,724,926 | B2 | 4/2004 | Jones |
| 6,763,924 | B2 | 7/2004 | Olbrich |
| 7,219,832 | B2 * | 5/2007 | Fillinger et al. ............ 235/379 |
| 2002/0055835 | A1 | 5/2002 | Carcoba |
| 2002/0082962 | A1 * | 6/2002 | Farris et al. .................. 705/35 |
| 2005/0167481 | A1 | 8/2005 | Hansen |
| 2006/0010063 | A1 | 1/2006 | Drummond |
| 2006/0015437 | A1 | 1/2006 | Kulasooriya |

FOREIGN PATENT DOCUMENTS

| | | |
|---|---|---|
| EP | 1113142 | 7/2001 |
| JP | 103564 | 1/1998 |
| JP | 2000113285 | 4/2000 |
| WO | WO9503582 | 2/1995 |
| WO | WO0005688 | 2/2002 |
| WO | WO0211028 | 2/2002 |

OTHER PUBLICATIONS

Press release (PR hereinafter, HKIA Introduces Self-service Airline Check-in Kiosks—Hong Kong, Oct. 20, 2008).*

* cited by examiner

*Primary Examiner* — Ojo O Oyebisi

(74) *Attorney, Agent, or Firm* — K&L Gates LLP

(57) ABSTRACT

The present disclosure provides methods and apparatus for providing currency at an airline check-in machine. In general, the improved airline check-in machine dispenses one or more currencies for the user. Preferably, the currency(s) are selected from a database of currency based on the geographic location of the airline check-in machine and/or the user's flight destination. For example, the airline check-in machine may offer Euros based on a determination the user is traveling to Italy. In addition, the user may choose to pay for the currency using the same debit or credit card the user inserted into the airline check-in machine for identification or in any other suitable manner.

22 Claims, 6 Drawing Sheets

METHODS AND APPARATUS FOR PROVIDING CURRENCY AT AN AIRLINE CHECK-IN MACHINE

TECHNICAL FIELD

The present application relates in general to currency exchanges and more specifically to methods and apparatus for providing currency at an airline check-in machine.

BACKGROUND

Travelers to other countries often check in for their flight using an airline check-in machine (ACM). In addition, these travelers often need to exchange currency for their trip. A system is needed to provide currency to customers closer in time to when the currency is needed and closer in proximity to where the currency is needed.

SUMMARY

The present disclosure provides methods and apparatus for providing currency at an airline check-in machine (ACM). In general, the improved ACM dispenses one or more currencies for the user. The currency may be dispensed in any suitable manner such as cash, credits, a new prepaid debit card, an exiting debit card, a wireless device, etc. In any of these embodiments, the currency may be physically dispensed from the ACM or given to the user at some other time, such as during or after the flight. Preferably, the currency(s) are selected from a database of currency based on the geographic location of the ACM and/or one or more destinations in the user's flight itinerary. For example, the ACM may offer Euros based on a determination the user is traveling to Italy.

The user may choose to pay for the currency using the same debit or credit card the user inserted into the ACM for identification or the user may use any other suitable method of payment such as an ACH transfer, cash, online account, airline account, etc.

DETAILED DESCRIPTION

Figure 1:
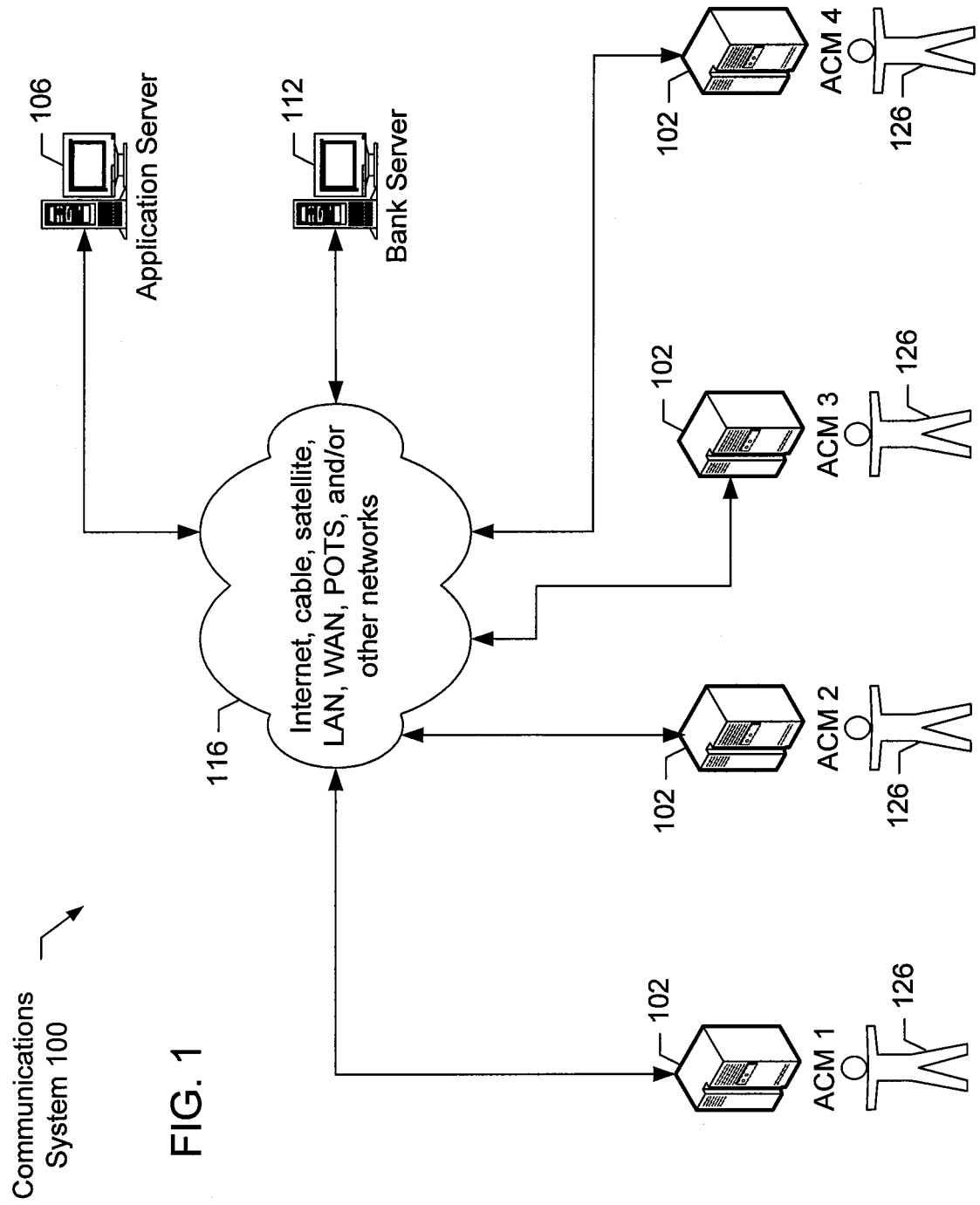
FIG. 1 is a high level block diagram of an example communications system.

The present system is most readily realized in a network communications system. A high level block diagram of an exemplary network communications system 100 is illustrated in FIG. 1. The illustrated system 100 includes one or more airline check-in machines (ACMs) 102, one or more application servers 106, and one or more bank servers 112. These devices may communicate with each other via a connection to one or more communications channels 116. The communications channels 116 may be any suitable communications channels 116 such as the Internet, cable, satellite, local area network, wide area networks, telephone networks, wireless networks, etc. It will be appreciated that any of the devices described herein may be directly connected to each other and/or connected over one or more networks. Although airline check-in machines are used throughout the following examples, it will be appreciated that any suitable check-in machine may used without departing form the scope and spirit of the present invention. For example, a train check-in machine and/or a ship check-in machine may be used.

One server 106, 112 may interact with a large number of ACMs 102. Accordingly, each server 106, 112 is typically a high end computing device with a large storage capacity, one or more fast microprocessors, and one or more high speed network connections. Conversely, relative to a server 106, 112, each ACM 102 typically includes less storage capacity, less processing power, and a slower network connection.

Figure 2:
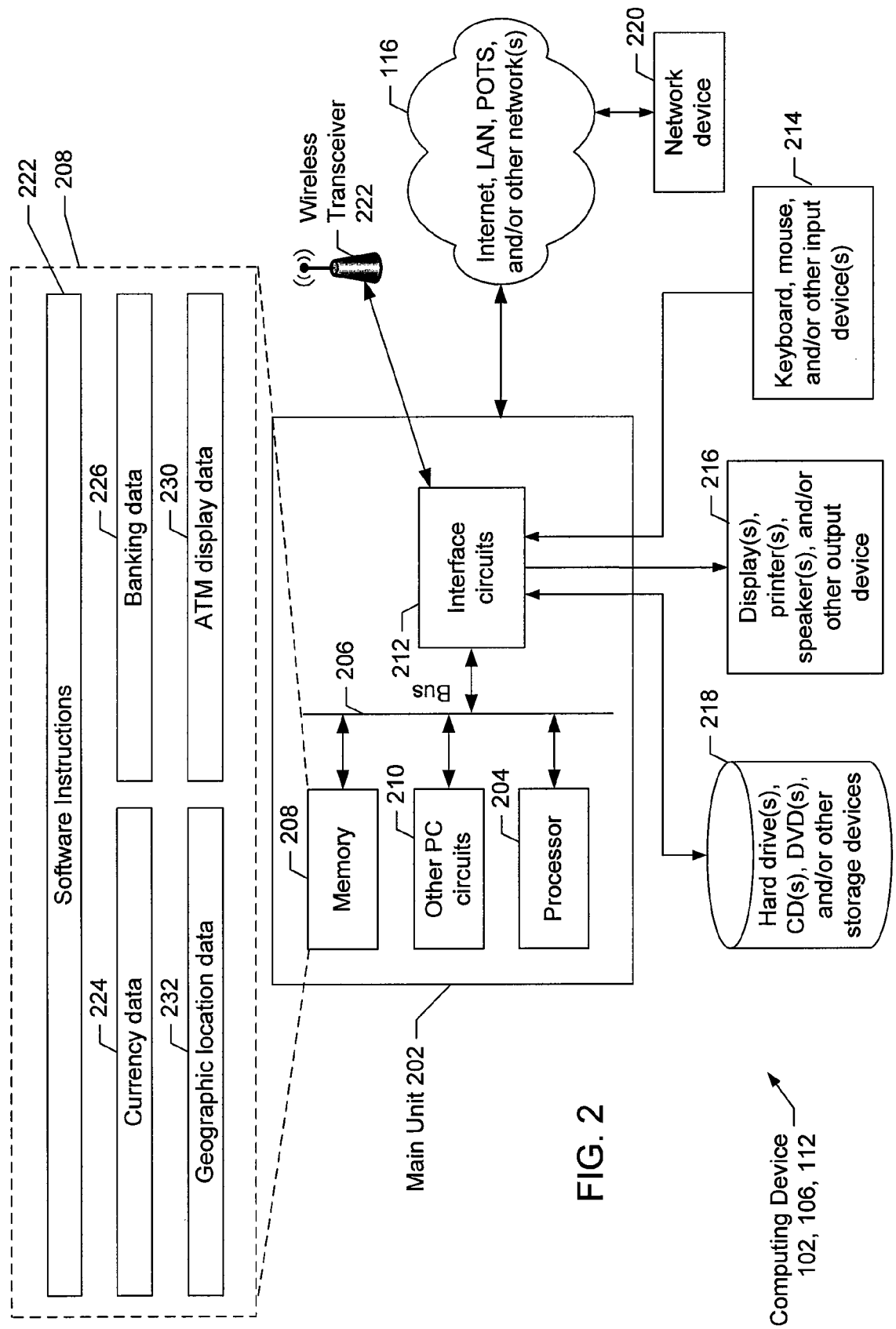
FIG. 2 is a more detailed block diagram showing one example of a computing device.

A detailed block diagram of an example computing device 102, 106, 112 is illustrated in FIG. 2. Each computing device 102, 106, 112 may include a server, a personal computer (PC), an ACM, a personal digital assistant (PDA), a mobile telephone and/or any other suitable computing device. Each computing device 102, 106, 112 preferably includes a main unit 202 which preferably includes one or more processors 204 electrically coupled by an address/data bus 206 to one or more memory devices 208, other computer circuitry 210, and one or more interface circuits 212. The processor 204 may be any suitable microprocessor.

The memory 208 preferably includes volatile memory and non-volatile memory. Preferably, the memory 208 and/or another storage device 218 stores software instructions 222 that interact with the other devices in the system 100 as described herein. These software instructions 222 may be executed by the processor 204 in any suitable manner. The memory 208 and/or another storage device 218 may also store one or more data structures 224, 226, 230, 232, such as digital data indicative of documents, files, programs, web pages, etc. retrieved from another computing device 102, 106, 112 and/or loaded via an input device 214.

The example data structures 224, 226, 230, 232 shown in FIG. 2 include currency data 224, banking data 226, ACM display data 230, and geographic location data 232. Preferably, currency data 224 is used to determine currency amounts as described in detail below. For example, exchange rates may be updated daily. Preferably, banking data 226 is used to authorize a transaction as described in detail below. For example, banking data 226 may include account numbers, approvals, etc. Preferably, ACM display data 230 is used to display user interface screens for an ACM 102 as described in detail below. For example, ACM display data 230 may include ACM text, ACM graphics, dollar amounts, transaction types, transaction times, etc. Preferably, geographic location data 232 is used to identify a geographic location associated with a particular ACM 102 and/or a particular user 126. For example, geographic location data 232 may include the user's flight destination, Global Positioning System (GPS) data, latitudes, longitudes zip codes, area codes, cities, states, streets, addresses, etc.

It will be appreciated that many other data fields and records may be stored in the data structures 224, 226, 230, 232 to facilitate implementation of the methods and apparatus disclosed herein. In addition, it will be appreciated that any type of suitable data structure (e.g., a flat file data structure, a relational database, a tree data structure, etc.) may be used to facilitate implementation of the methods and apparatus disclosed herein.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays, printers, speakers, and/or other output devices 216 may also be connected to the main unit 202 via the interface circuit 212. The display 216 may be a cathode ray tube (CRTs), liquid crystal displays (LCDs), a touch screen, or any other type of display. The display 216 generates visual displays of data generated during operation of the computing device 102, 106, 112. For example, the display 216 may be used by an ACM 102 to display currency data 224 received from the currency server 108. The visual displays may include prompts for human input, text, graphics, video, calculated values, data, etc. For example, an ACM 102 may ask a user 126 for a currency type and/or amount.

One or more storage devices 218 may also be connected to the main unit 202 via the interface circuit 212. For example, a hard drive, CD drive, DVD drive, flash memory drive, and/or other storage devices may be connected to the main unit 202. The storage devices 218 may store any type of data used by the computing device 102, 106, 112.

Each computing device 102, 106, 112 may also exchange data with other computing devices 102, 106, 112 and/or other network devices 220 via a connection to the communication channel(s) 116. The communication channel(s) 116 may be any type of network connection, such as an Ethernet connection, WiFi, WiMax, digital subscriber line (DSL), telephone line, coaxial cable, etc. Data may be passed across the communication channel(s) 116 using encryption built into the computing devices 102, 106, 112.

Figure 3:
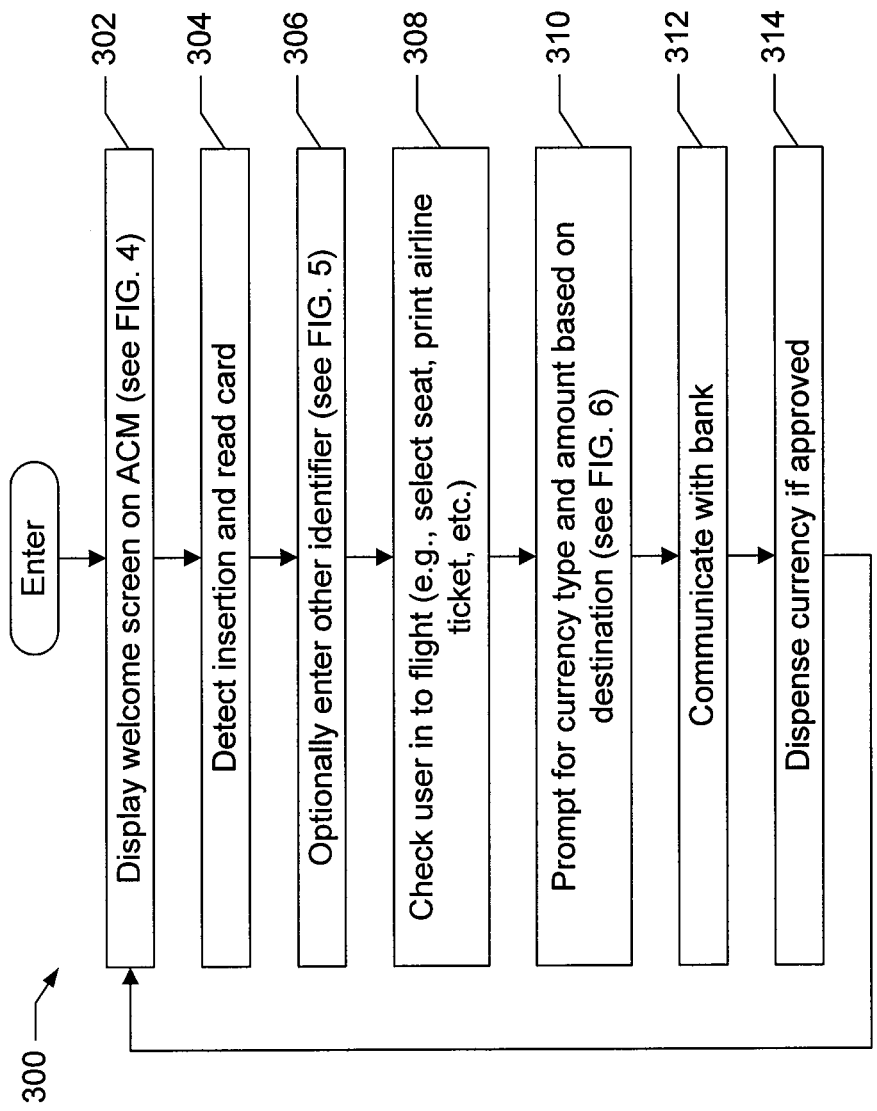
FIG. 3 is a first portion of a flowchart showing one example of a system for providing currency at an airline check-in machine.

A flowchart of an example process 300 for providing currency at an airline check-in machine is presented in FIG. 3. Preferably, the process 300 is embodied in one or more software programs 222 which is stored in one or more memories 208, 218 and executed by one or more processors 204. Although the process 300 is described with reference to the flowchart illustrated in FIG. 3, it will be appreciated that many other methods of performing the acts associated with process 300 may be used. For example, the order of many of the steps may be changed, and some of the steps described may be optional.

In general, the improved airline check-in machine dispenses one or more currencies for the user. Preferably, the currency(s) are selected from a database of currency based on the geographic location of the airline check-in machine and/or the user's flight destination. For example, the airline check-in machine may offer Euros based on a determination the user is traveling to Italy. In addition, the user may choose to pay for the currency using the same debit or credit card the user inserted into the airline check-in machine for identification.

Figure 4:
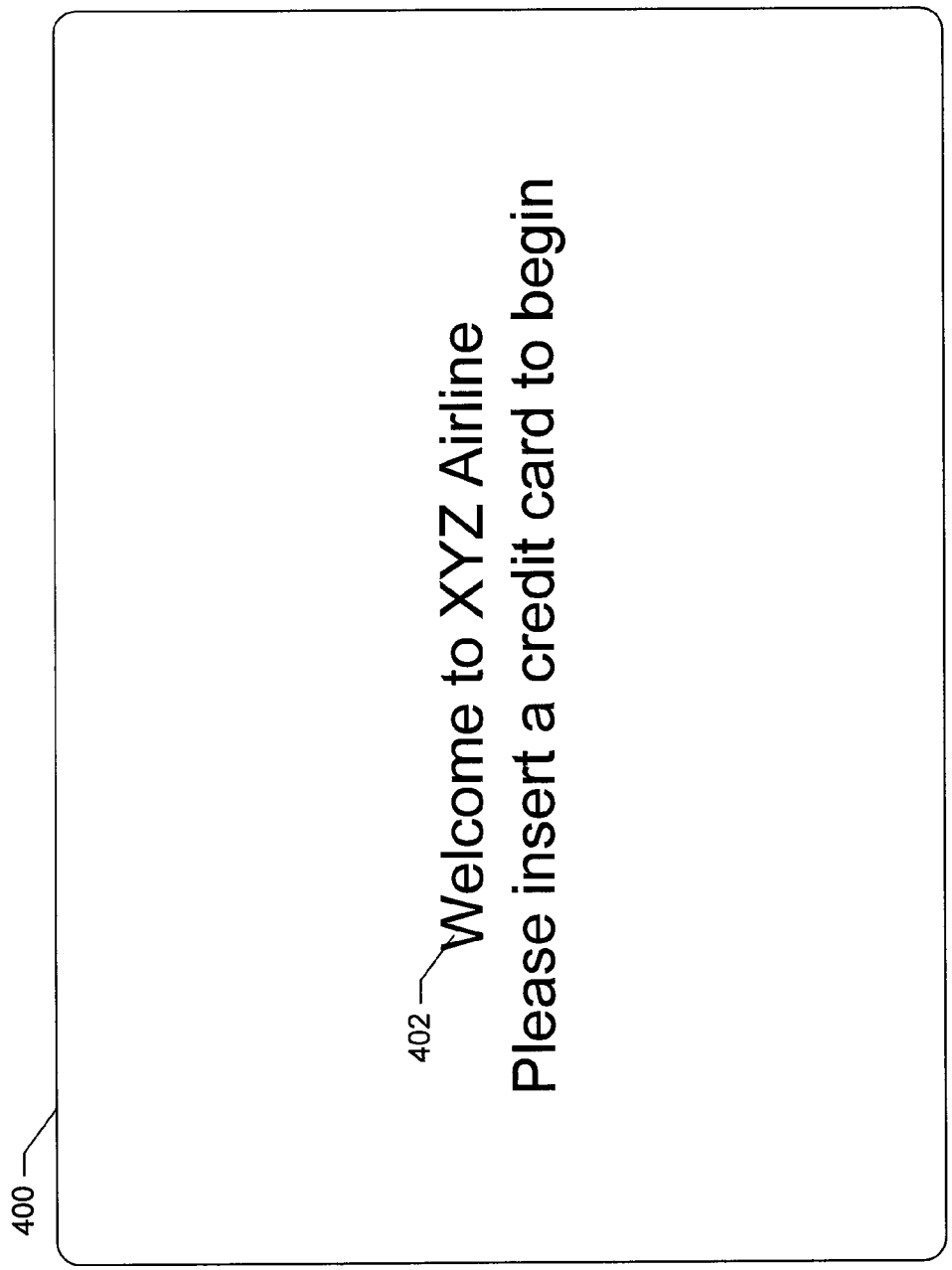
FIG. 4 is a screen shot showing an example ACM welcome screen.

The example process 300 begins with an ACM 102 displaying a welcome screen (block 302). A screen shot of an example ACM welcome screen 400 is illustrated in FIG. 4. In this example, the welcome screen 400 includes a text message 402. It will be appreciated that other data may be displayed on the ACM welcome screen 400. For example, currency choices may be displayed on the ACM welcome screen 400.

Figure 5:
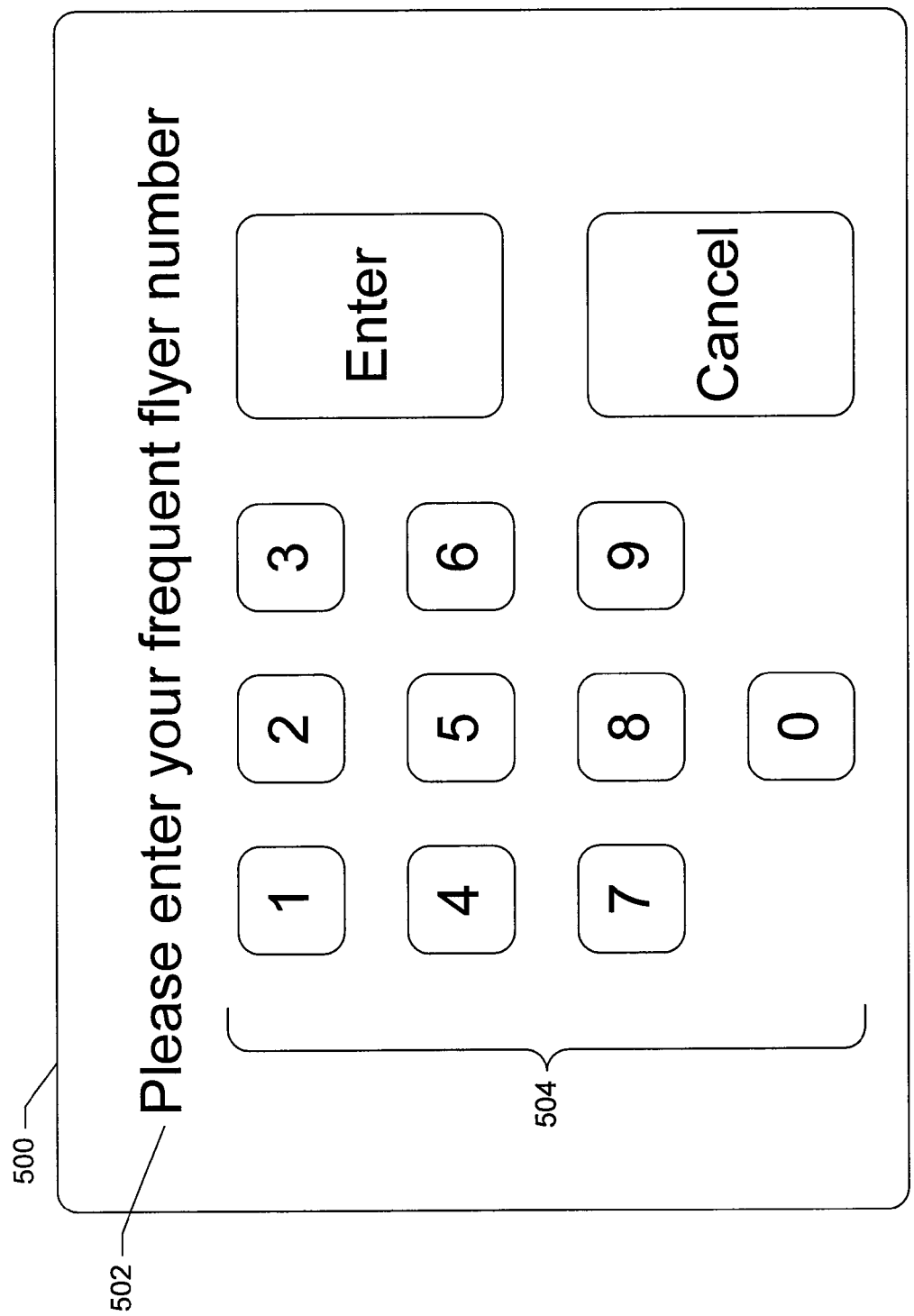
FIG. 5 is a screen shot showing an example data entry screen.

Preferably, the ACM 102 detects an insertion of a debit or credit card and reads the data encoded on the credit card (block 304). Alternatively or in addition, the user 126 may elect to enter his/her frequent flyer number. A screen shot of an example frequent flyer number entry screen 500 is illustrated in FIG. 5. The frequent flyer number may be used to identify the user 126, and/or the frequent flyer number may be used to pay for the desired currency with the user's frequent flyer miles and/or airline credits. In this example, the entry screen 500 includes a text message 502 and a touch screen keypad 504. The user 126 may enter his/her frequent flyer number using the touch screen keypad 504 and/or a physical keypad in a well known manner. It will be appreciated that any suitable substitute for the credit card and/or the credit card number may be used. For example, instead of a credit card, the user 126 may have a wireless device capable of transmitting the encoded data. Similarly, the credit card number may be entered via a wireless device and/or some other user identifier may be used, such as an airline reservation code.

Figure 6:
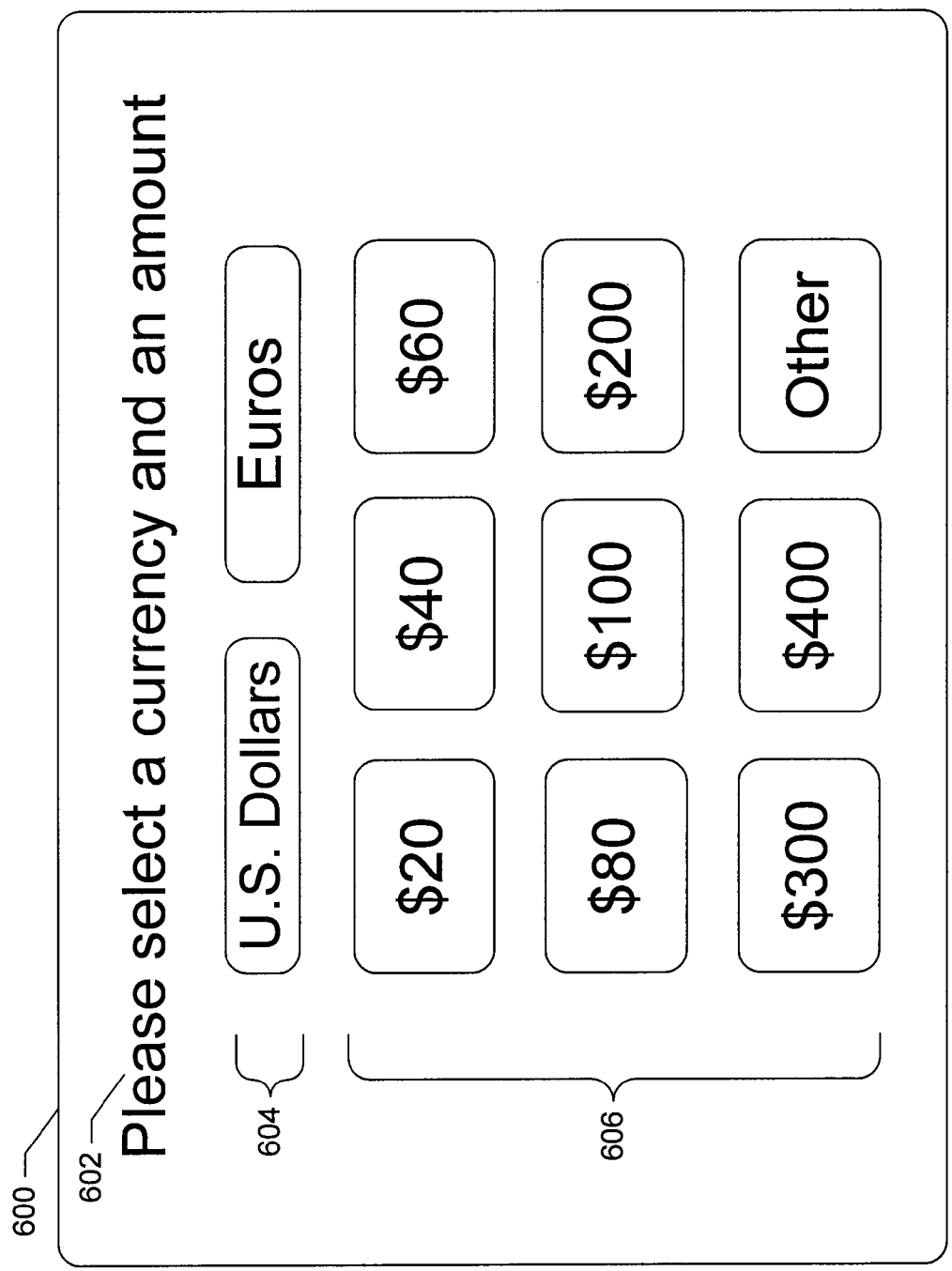
FIG. 6 is a screen shot showing an example currency selection screen.

Once the user 126 is identified, the ACM displays one or more flight transaction screens to check the user 126 in to the flight (block 308). Next, the ACM displays one or more currency transaction screens (block 310). A screen shot of an example currency transaction screen 600 is illustrated in FIG. 6. In this example, the currency transaction screen 600 includes a text message 602, a currency type selection area 604, and an amount selection area 606. The user 126 may select an currency type (e.g., U.S. dollars) and an amount (e.g., $100) to effectively withdraw funds from his/her credit card account in the selected currency. It will be appreciated that any suitable method of indicating accounts, amounts, and/or other data may be used. For example, the selectable currencies may be based on the user's flight itinerary. In addition, any number of ACM transaction screens may be used.

Once the user 126 provides his/her transaction selections and/or transaction data, the ACM 102 executes the currency transaction (block 312). For example, the ACM 102 may communicate with a bank or other suitable financial institution for approval and dispense the requested currency if approved (block 314). It will be appreciated that the currency may be dispensed in any suitable manner such as cash, credits, a new prepaid debit card, an exiting debit card, a wireless device, etc. In any of these embodiments, the currency may be physically dispensed from the ACM 102 or given to the user at some other time, such as during or after the flight.

If the currency is delivered at the ACM 102 (either physically or to a card, etc.), the ACM 102 preferably also dispenses a receipt. For example, the receipt may be printed and physically dispended or wirelessly transmitted to a hand held device. If the currency is to be given to the user 126 at some other time, the ACM 102 preferably dispenses a ticket used to receive the actual currency. Again, this ticket may be physical and/or electronic. In some embodiments, the receipt and/or ticket may include additional useful information for the user 126. For example, exchange rates, local tipping policies, etc. for one or more destinations from the user's itinerary may be printed on the receipt/ticket.

In some embodiments, the user 126 may pay for services (like a ride from the airport to the hotel, restaurants, tickets to shows or tour sites) from the ACM 102 in order to provide an opportunity to pay an up-front discounted price in the user's own currency, before the user 126 leaves for his destination.

In summary, persons of ordinary skill in the art will readily appreciate that methods and apparatus for providing currency at an airline check-in machine have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

The invention claimed is:

1. A method of dispensing currency, the method comprising:
   receiving a user identifier at an airline check-in machine, the airline check-in machine being located at a first geographical location;
   determining a second geographical location based on the user identifier by determining a flight destination associated with a flight itinerary corresponding to the user identifier;
   responsive to determining the flight destination, offering currency for the second geographical location;
   receiving a desired currency amount;
   determining an exchange rate based on the user identifier and the second geographical location;
   determining a charge amount based on the exchange rate and the desired currency amount;
   charging the charge amount to an account associated with the user identifier; and
   outputting the currency from the airline check-in machine.

2. The method of claim 1, wherein receiving the user identifier includes reading a magnetic strip located on a credit card.

3. The method of claim 2, wherein charging the charge amount to the account associated with the user identifier includes charging the credit card.

4. The method of claim 1, wherein receiving the user identifier includes reading a magnetic strip located on a debit card.

5. The method of claim 4, wherein charging the charge amount to the account associated with the user identifier includes charging the debit card.

6. The method of claim 1, wherein receiving the user identifier includes receiving an airline reservation code.

7. The method of claim 1, wherein receiving the user identifier includes receiving an airline loyalty code.

8. The method of claim 1, wherein determining the second geographical location based on the user identifier includes a database lookup associated with an airline flight to the second geographical location.

9. The method of claim 1, wherein receiving the desired currency amount includes receiving the desired currency amount in units associated with the first geographical location.

10. The method of claim 1, wherein receiving the desired currency amount includes receiving the desired currency amount in units associated with the second geographical location.

11. The method of claim 1, wherein outputting the currency from the airline check-in machine includes printing a currency certificate.

12. An apparatus for dispensing currency, the apparatus comprising:
    a processor;
    a display device operatively coupled to the processor;
    a user input device operatively coupled to the processor; and
    a memory device operatively coupled to the processor, the memory device storing software instructions to cause the processor to:
        receive a user identifier at a first geographical location;
        determine a second geographical location based on the user identifier by determining a flight destination associated with a flight itinerary corresponding to the user identifier;
        responsive to determining the flight destination, offer currency for the second geographical location;
        receive a desired currency amount;
        determine an exchange rate based on the user identifier and the second geographical location;
        determine a charge amount based on the exchange rate and the desired currency amount;
        charge the charge amount to an account associated with the user identifier; and
        output the currency.

13. The apparatus of claim 12, wherein receiving the user identifier includes reading a magnetic strip located on at least one of a credit card and a debit card.

14. The apparatus of claim 13, wherein charging the charge amount to the account associated with the user identifier includes charging at least one of the credit card and the debit card.

15. The apparatus of claim 12, wherein receiving the user identifier includes receiving at least one of an airline reservation code and an airline loyalty code.

16. The apparatus of claim 12, wherein determining the second geographical location based on the user identifier includes a database lookup associated with an airline flight to the second geographical location.

17. The apparatus of claim 12, wherein receiving the desired currency amount includes receiving the desired currency amount in units associated with the first geographical location.

18. The apparatus of claim 12, wherein receiving the desired currency amount includes receiving the desired currency amount in units associated with the second geographical location.

19. The apparatus of claim 12, wherein outputting the currency includes printing a currency certificate.

20. A computer readable medium storing software instructions to cause a computing device to:
    receive a user identifier at an airline check-in machine, the airline check-in machine being located at a first geographical location;
    check a user associated with the user identifier into an airline flight corresponding to the user identifier;
    determine a second geographical location based on the user identifier by determining a flight destination associated with a flight itinerary corresponding to the user identifier;
    responsive to determining the flight destination, offer currency for the second geographical location;
    receive a desired currency amount;
    determine an exchange rate based on the user identifier and the second geographical location;
    determine a charge amount based on the exchange rate and the desired currency amount;
    charge the charge amount to an account associated with the user identifier; and
    output the currency from the airline check-in machine.

21. The method of claim 1, further comprising providing an airline ticket for the airline flight.

22. The method of claim 1, further comprising checking a user associated with the user identifier into the airline flight.

* * * * *